Dec. 29 1925
1,567,726
D. E. FRIERSON
MOISTUREPROOF CONDIMENT HOLDER
Filed July 21, 1922
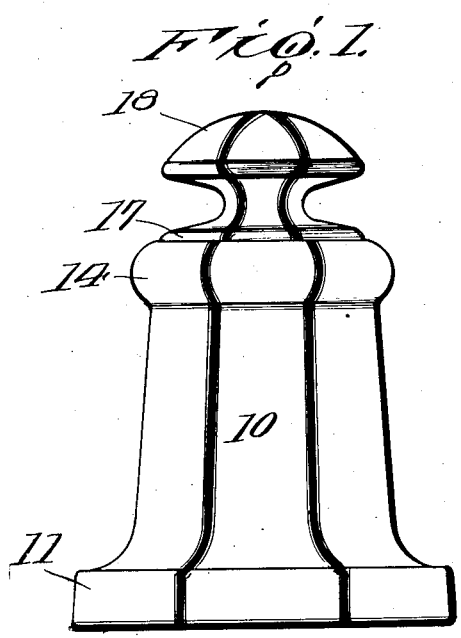
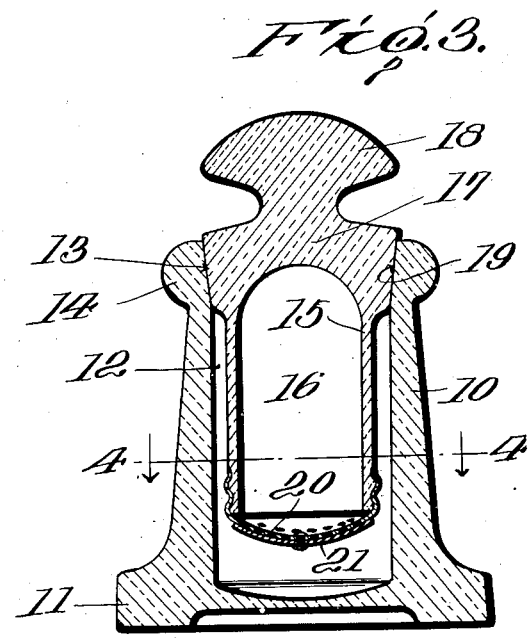
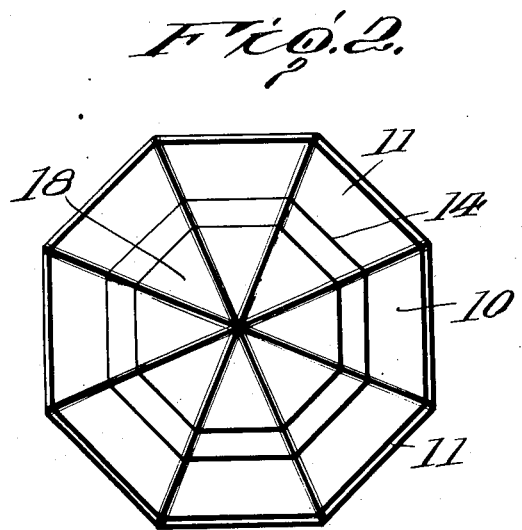
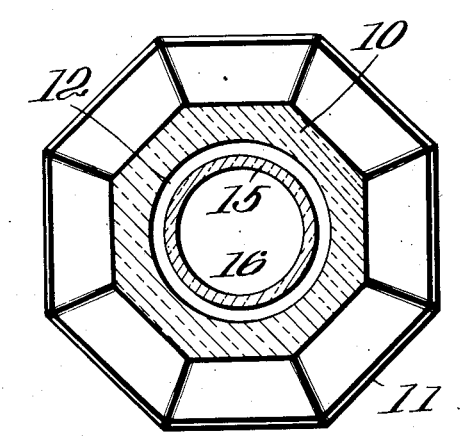
Inventor
David Elmore Frierson
By Wm D Hodges
Attorney Patented Dec. 29, 1925.

1,567,726

UNITED STATES PATENT OFFICE.

DAVID ELMORE FRIERSON, OF CHARLESTON, WEST VIRGINIA.

MOISTUREPROOF CONDIMENT HOLDER.

Application filed July 21, 1922. Serial No. 576,408.

*To all whom it may concern:*

Be it known that I, DAVID ELMORE FRIERSON, a citizen of the United States, residing at Charleston, in the county of Kanawha and State of West Virginia, have invented a new and useful Moistureproof Condiment Holder, of which the following is a specification.

This invention is a condiment holder of the shaker type.

One of the objects of the invention is to provide a moisture proof holder for such condiments, chemicals, medicines and the like, as have the property of absorbing atmospheric moisture to such an extent as to normally impede the emptying of the container. A further object is to provide a shaker, and a substantially air tight moisture proof holder in which the shaker is normally retained when not in use, said receptacle being so designed as to provide a convenient support for the shaker, and to prevent moisture from reaching the contents thereof.

The invention will be hereinafter fully set forth and particularly pointed out in the claims.

In the accompanying drawing:—

Figure 1 is a side elevation illustrating a holder constructed in accordance with the invention. Figure 2, is a top plan view thereof. Figure 3 is a longitudinal sectional view thereof and Figure 4 is a transverse section on the line 4—4, Figure 3.

Referring to the drawing, 10 designates a support provided with a base 11, and an internal chamber 12 open at the top. The open end of the chamber is slightly flared as indicated at 13, and provided with a ground surface, said open end being surrounded by a bead 14, to strengthen the same.

The shaker 15 is constructed with a cylindrical body forming the casing of a central longitudinal chamber 16, the upper end of said shaker being made solid, as indicated at 17, shaped to provide a knob-like handle 18. The solid portion is exteriorly tapered, as indicated at 19, to engage the flared portion or seat 13, and form a tight joint therewith. The lower open end of the shaker is covered by a removable perforated cap 20, which in turn is covered by a rotatable disk 21, having perforations which may be brought into register with the perforations of the cap.

In practice, the parts are preferably made of glass or other vitreous substance, and the flaring surface 13 and the complemental tapered surface 19 are preferably ground to provide an air tight joint. It will be noted that the inside surface of the chamber 12 is vertically disposed and that the exterior surface of the casing 15 lies parallel therewith, but slightly spaced therefrom, the casing 15 being of somewhat less diameter than the solid portion 17 of the shaker. The solid portion 18 is of sufficient weight to cause the tapered portions 13 and 19 to come into engagement and maintain a moisture proof joint when the body 16 is inserted into the chamber 12. The support member may be constructed of any preferred external design, a polygonal contour such as shown, being preferred. The solid portion and the handle portion of the shaker are also correspondingly shaped to impart uniformity of design.

In operation, the cap 20 is removed from the shaker and the chamber 16 of the latter is filled with salt, or any other material to be protected, after which said cap is returned to its position over the end of chamber 16, and the disk 21 moved to cover the perforations therein. The shaker is then inserted cap end down into the chamber 12, the conical portion 19 forming an air and moisture tight joint with the flared seat 13 at the top thereof. It will be readily understood that when the parts are in this position practically no moisture may enter the chamber 12 or reach the contents of the shaker. When it is desired to use the shaker it is only necessary to remove it from the support member by means of the handle 18, rotate the disk 21 to bring its perforations in register with the perforations of cap 20, and to shake the contents therefrom in a manner which is well-known and clearly understood.

The advantages of the invention will be readily apparent. It will be particularly observed that a moisture proof holder is provided which will protect the contents of the shaker to such an extent, that absorption of atmospheric moisture is practically prevented. The device is very simple and compact in structure, presents a pleasing appearance, and is capable of being employed where the ordinary condiment shakers are normally used.

Having thus explained the nature of the invention and described an operative manner of constructing and using the same, although without attempting to set forth all of the forms in which it may be made, or all of the forms of its use, what is claimed is:—

1. A condiment holder of the character described comprising a hollow support member having an open top and an enlarged base portion, said open end having an internal tapered portion, and a condiment container member open at one end and having a solid enlargement at the other end, said enlargement having an external taper complemental to the tapered portion of the open end of said support member, so that an air and moisture tight joint is formed when the container member is inserted into the support member, and a perforated closure for the open end of the container member.

2. A condiment holder of the character described comprising a support member having an internal cylindrical chamber open at its top, the wall of said chamber contiguous to the top flaring outwardly, said support member having its bottom provided with an enlarged base portion, and a condiment-container member provided with a cylindrical body portion of substantially less diameter than the diameter of said chamber, said condiment member having a solid enlarged portion the exterior of which is tapered to fit the flared portion of said chamber when said cylindrical body portion is inserted into said chamber, whereby an air and moisture proof joint is provided.

3. A condiment holder of the character described comprising a support member having an open reenforced top and an enlarged base portion, said open end having an internal tapered portion, and a condiment-container member having a solid enlargement, the exterior of which is tapered to fit the tapered portion of the support member, the weight of said solid enlargement tending to bring the tapered portions of the two members into engagement when the container member is inserted into the base member, whereby a tight joint is provided, said solid enlargement being shaped to provide a handle.

In testimony whereof I have hereunto set my hand.

DAVID ELMORE FRIERSON.